United States Patent
Bender et al.

(10) Patent No.: US 7,281,132 B2
(45) Date of Patent: Oct. 9, 2007

(54) USING TOKEN-BASED SIGNING TO INSTALL UNSIGNED BINARIES

(75) Inventors: Michael S. Bender, Boulder Creek, CA (US); Benjamin H. Stoltz, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1065 days.

(21) Appl. No.: 10/044,879

(22) Filed: Oct. 19, 2001

(65) Prior Publication Data

US 2003/0079045 A1   Apr. 24, 2003

(51) Int. Cl.
G06F 21/22 (2006.01)
G06F 21/24 (2006.01)
H04L 29/12 (2006.01)
H04L 9/00 (2006.01)

(52) U.S. Cl. ............... 713/172; 713/159; 713/171; 713/173; 380/264; 380/277; 380/284; 380/229; 726/9; 726/20

(58) Field of Classification Search .......... 713/200
See application file for complete search history.

(56) References Cited

U.S. PATENT DOCUMENTS

| | | | |
|---|---|---|---|
| 5,297,189 A * | 3/1994 | Chabernaud .......... 455/461 |
| 5,923,884 A * | 7/1999 | Peyret et al. .......... 717/167 |
| 5,953,528 A * | 9/1999 | Sullivan .......... 707/100 |
| 6,314,521 B1 * | 11/2001 | Debry .......... 713/201 |
| 6,338,140 B1 * | 1/2002 | Owens et al. .......... 713/168 |
| 6,446,207 B1 * | 9/2002 | Vanstone et al. .......... 713/180 |
| 6,665,405 B1 * | 12/2003 | Lenstra .......... 380/28 |
| 6,707,915 B1 * | 3/2004 | Jobst et al. .......... 380/247 |
| 6,853,988 B1 * | 2/2005 | Dickinson et al. .......... 705/75 |
| 6,892,301 B1 * | 5/2005 | Hansmann et al. .......... 713/172 |
| 6,931,381 B1 * | 8/2005 | Petit .......... 705/53 |
| 2002/0152385 A1 * | 10/2002 | Vanstone et al. .......... 713/176 |
| 2003/0069924 A1 * | 4/2003 | Peart et al. .......... 709/203 |
| 2003/0110389 A1 * | 6/2003 | Elteto .......... 713/191 |
| 2004/0015694 A1 * | 1/2004 | DeTreville .......... 713/172 |
| 2004/0024688 A1 * | 2/2004 | Bi et al. .......... 705/37 |
| 2005/0192099 A1 * | 9/2005 | Nguyen et al. .......... 463/42 |

* cited by examiner

Primary Examiner—Syed A. Zia
(74) Attorney, Agent, or Firm—Martine Penilla & Gencarella, LLP

(57) ABSTRACT

The present invention provides for token based signing of an unsigned binary which may be a stream of bits (e.g., 0's and 1's). The unsigned binary is signed using a secret key which resides in a token (e.g., a smart card), which makes the secret key available to the token holder. The unsigned binary is downloaded and verified for authenticity by the token coupled to a computing device. In one embodiment, the downloaded unsigned binary is encrypted. If the unsigned binary is authentic, it may be used to replace the prior firmware on that computing device.

14 Claims, 12 Drawing Sheets

HID

USING TOKEN-BASED SIGNING TO INSTALL UNSIGNED BINARIES

BACKGROUND OF THE INVENTION

1. Field of the Invention

The present invention relates to token based signing of unsigned binaries.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

An operating system is computer software that controls the many different operations of a computer and directs and coordinates its processing of programs. The operating system is made up of a complex set of instructions that schedules the series of jobs (user applications) to be performed by the computer and allocates them to the computer's various hardware systems, such as the processor, main memory, and peripheral systems.

In modern computing environments, the operating system for a computing device (or other computer program) may be downloaded to the device across a computer network from another computer and placed in an area of the computer that normally can not easily be overwritten, and is termed firmware. Downloading the operating system or other firmware is particularly advantageous when the firmware is upgraded or altered in some manner and the user of the computer wishes to take advantage of the alterations or upgrades.

Problems occur, however, when firmware is downloaded. In particular, some files downloaded across computer networks are compromised for various reasons. One example is the case of a "trojan horse" computer program where a malicious user substitutes the correct firmware with the trojan horse. The trojan horse is then downloaded in place of the firmware and begins to perform malicious actions on the computing device which may destroy a user's important files and even may ruin the computer's hardware. Thus, security measures should be in place to ensure that the downloaded firmware is actually the computer program that the user intends to run on the computing device. Implementing these security measures, however, is difficult. In the past these difficulties have stopped firmware developers from making enhancements to computer programs, such as operating systems, and have inhibited the ability to update the computing devices with the enhancements.

Before describing the current security measures in place to prevent problems such as trojan horses, an example computing environment where this problem has specific application is described below.

Multi-Tier Application Architecture

In the multi-tier application architecture, a client communicates requests to a server for data, software and services, for example, and the server responds to the requests. The server's response may entail communication with a database management system for the storage and retrieval of data.

The multi-tier architecture includes at least a database tier that includes a database server, an application tier that includes an application server and application logic (i.e., software application programs, functions, etc.), and a client tier. The application server responds to application requests received from the client. The application server forwards data requests to the database server.

FIG. 1 provides an overview of a multi-tier architecture. Client tier 100 typically consists of a computer system that provides a graphic user interface (GUI) generated by a client 110, such as a browser or other user interface application. Conventional browsers include Internet Explorer and Netscape Navigator, among others. Client 110 generates a display from for example, a specification of GUI elements (e.g., a file containing input, form, and text elements defined using the Hypertext Markup Language (HTML)) and/or from an applet (i.e., a program such as a program written using the Java™ programming language, or other platform independent programming language, that runs when it is loaded by the browser).

Further application functionality is provided by application logic managed by application server 120 in application tier 130. The apportionment of application functionality between client tier 100 and application tier 130 is dependent upon whether a "thin client" or "thick client" topology is desired. In a thin client topology, the client tier (i.e., the end user's computer) is used primarily to display output and obtain input, while the computing takes place in other tiers. A thick client topology, on the other hand, uses a more conventional general purpose computer having processing, memory, and data storage abilities. Database tier 140 contains the data that is accessed by the application logic in application tier 130. Database server 150 manages the data, its structure and the operations that can be performed on the data and/or its structure.

Application server 120 can include applications such as a corporation's scheduling, accounting, personnel and payroll applications, for example. Application server 120 manages requests for the applications that are stored therein. Application server 120 can also manage the storage and dissemination of production versions of application logic. Database server 150 manages the database(s) that manage data for applications. Database server 150 responds to requests to access the scheduling, accounting, personnel and payroll applications' data, for example.

Connection 160 is used to transmit data between client tier 100 and application tier 130, and may also be used to transfer the application logic to client tier 100. The client tier can communicate with the application tier via, for example, a Remote Method Invocator (RMI) application programming interface (API) available from Sun Microsystems™. The RMI API provides the ability to invoke methods, or software modules, that reside on another computer system. Parameters are packaged and unpackaged for transmittal to and from the client tier. Connection 170 between application server 120 and database server 150 represents the transmission of requests for data and the responses to such requests from applications that reside in application server 120.

Elements of the client tier, application tier and database tier (e.g., client 110, application server 120 and database server 150) may execute within a single computer. However, in a typical system, elements of the client tier, application tier and database tier may execute within separate computers interconnected over a network such as a LAN (local area network) or WAN (wide area network).

Thus, with the distribution of functionality between three or more tiers, the machine-centric view of computing diminishes as the need to perform the complete realm of functionality moves away from solely being in the client tier to the other tiers as well. Hence, the type of computing arrangement that is needed on the client tier also changes, for instance the operating system to be used on a computer in the client tier is often downloaded across the multi-tiered network.

Security Measures

When downloading an operating system or other firmware, for instance when a developer has made enhancements to an existing operating system, it is desirable to have security measures in place so that the computer system is not compromised for any reason, such as when a malicious user substitutes the correct operating system file with the trojan horse. One method to provide added security is by using a cryptographic system.

A cryptographic system is a system for sending a message from a sender to a receiver over a medium so that the message is "secure", that is, so that only the intended receiver can recover the message. A cryptographic system converts a message, referred to as "plaintext" into an encrypted format, known as "ciphertext." The encryption is accomplished by manipulating or transforming the message using a "cipher key" or keys. The receiver "decrypts" the message, that is, converts it from ciphertext to plaintext, by reversing the manipulation or transformation process using the cipher key or keys. So long as only the sender and receiver have knowledge of the cipher key, such an encrypted transmission is secure.

A "classical" cryptosystem is one in which the enciphering information can be used to determine the deciphering information. To provide security, a classical cryptosystem requires that the enciphering key be kept secret and provided to users of the system over secure channels. Secure channels, such as secret couriers, secure telephone transmission lines, or the like, are often impractical and expensive.

A system that eliminates the difficulties of exchanging a secure enciphering key is known as "public key encryption." By definition, a public key cryptosystem has the property that someone who knows only how to encipher a message cannot use the enciphering key to find the deciphering key without a prohibitively lengthy computation. An enciphering function is chosen so that once an enciphering key is known, the enciphering function is relatively easy to compute. However, the inverse of the encrypting transformation function is difficult, or computationally infeasible, to compute. Such a function is referred to as a "one way function" or as a "trap door function." In a public key cryptosystem, certain information relating to the keys is public. This information can be, and often is, published or transmitted in a non-secure manner. Also, certain information relating to the keys is private. This information may be distributed over a secure channel to protect its privacy, (or may be created by a local user to ensure privacy).

A block diagram of a typical public key cryptographic system is illustrated in FIG. 2. A sender represented by the blocks within dashed line (200) sends a plaintext message, Ptxt, to a receiver, represented by the blocks within dashed line (215). The plaintext message is encrypted into a ciphertext message, C, transmitted over some transmission medium and decoded by the receiver (215) to recreate the plaintext message Ptxt.

The sender (200) includes a cryptographic device (201), a secure key generator (202) and a key source (203). The key source (203) is connected to the secure key generator (202) through line (204). The secure key generator (202) is coupled to the cryptographic device (201) through line (205). The cryptographic device provides a ciphertext output, C, on line (206). The secure key generator (202) provides a key output on line (207). This output is provided, along with the ciphertext message (206), to transmitter receiver (209). The transmitter receiver (209) may be, for example, a computer transmitting device such as a modem or it may be a device for transmitting radio frequency transmission signals. The transmitter receiver (209) outputs the secure key and the ciphertext message on an insecure channel (210) to the receiver's transmitter receiver (211).

The receiver (215) also includes a cryptographic device (216), a secure key generator (217) and a key source (218). The key source (218) is coupled to the secure key generator (217) on line (219). The secure key generator (217) is coupled to the cryptographic device (216) on line (220). The cryptographic device (216) is coupled to the transmitter receiver (211) through line (221). The secure key generator (217) is coupled to the transmitter receiver (211) on lines (222) and (223).

In operation, the sender (200) has a plaintext message, Ptxt, to send to the receiver (215). Both the sender (200) and the receiver (215) have cryptographic devices (201) and (216), respectively, that use the same encryption scheme. There are a number of suitable cryptosystems that can be implemented in the cryptographic devices. For example, they may implement the Data Encryption Standard DES) or some other suitable encryption scheme.

Sender and receiver also have secure key generators (202) and (217), respectively. These secure key generators implement any one of several well known public key exchange schemes. Known schemes include the Diffie-Hellman scheme, the RSA scheme, the Massey-Omura scheme, and the ElGamal scheme.

The sender (200) uses key source (203), which maybe a random number generator, to generate a private key. The private key is provided to the secure key generator (202) and is used to generate an encryption key, $e_K$. The encryption key, $e_K$, is transmitted on lines (205) to the cryptographic device and is used to encrypt the plaintext message, Ptxt, to generate a ciphertext message, C, provided on line (206) to the transmitter receiver (209). The secure key generator (202) also transmits the information used to convert to the secure key from key source (203) to the encryption key, $e_K$. This information can be transmitted over an insecure channel, because it is impractical to recreate the encryption key from this information without knowing the private key.

The receiver (215) uses key source (218) to generate a private and secure key (219). This private key (219) is used in the secure key generator (217) along with the key generating information provided by the sender (200) to generate a deciphering key, $D_K$. This deciphering key, $D_K$, is provided on line (220) to the cryptographic device (216) where it is used to decrypt the ciphertext message and reproduce the original plaintext message.

Authentication

In addition to protecting the contents of a transmitted message, it is also desired to provide a way to determine the "authenticity" of the message. That is, is the message actually from the purported sender. A scheme for accomplishing this is to append a so-called "digital signature" to the message. One such scheme is described herein. In this scheme the enciphering transformation $f_A$ is used to send a message to user A and $f_B$ is the enciphering transformation used to send a message to user B. User A provides a "signature", P, that may include some specific information, such as the time the message was sent or an identification number. User A transmits the signature as $f_B f_A^{-1}$ (P). When user B deciphers the message using $f_B^{-1}$, the entire message is decoded into plaintext except the signature portion, which remains $f_A^{-1}$ (P). User B then applies user A's public key $f_A$ to obtain P. Since P could only have been encrypted by user A (because only user A knows $f_A^{-1}$) user B can assume that the message was sent by user A.

Another scheme of digital signature authentication is a generalization of the ElGamal discrete logarithm scheme, using elliptic algebra. Assume a public key ourPub generated with a function of a private key ourPri. The signature is generated by first choosing a random integer, m, of approximately q bits. Next, a point, $P=m°(X_1/1)$, is computed. A message digest function, M, is used to compute an integer, u, that is a function of m, ourPri, and the digested version of the ciphertext message and the computed point, P. The computed pair (u, P) is transmitted as the signature.

At the receiving end, the value of the signature is used to compute the point $Q=u°(X_1/1)$. A point, R, is calculated using P, the digested version of the ciphertext message and P, and myPub. If R and Q do not compare exactly, the signature is not valid (not genuine). The security of this scheme relies on the computational infeasability of breaking the elliptic logarithm operation or the hash function.

Current Schemes

Using a cryptographic system such as one using public and private keys is one method that is currently used to attempt to ensure the security of a piece of firmware, such as an operating system when it is downloaded to a computer. Thus, one scheme downloads new firmware to a device that is signed with a secret key. Once downloaded, the firmware's signature is inspected by the device to ensure that it is authentic. If approved, the new firmware is made active on the new device, the new device re-boots, and the new firmware is used, for instance by the device using the new firmware image as its operating system This method is disadvantageous because it does not give a third-party firmware developer the ability to sign a piece of developed firmware. This means that the third-party developer has no way to enhance firmware and implement it on a machine.

One method that allows a third-party to develop and implement firmware is by providing the third-party with the secret key so that they can sign the firmware themselves. Serious drawbacks exist, however, if the private key escapes from the third-party and enters the general population, which often happens. In addition, the end-user may be malicious as well. If a malicious user receives the private key or it slips out into the general population, then whoever knows the key can compromise any computing device using such a key, which is disadvantageous.

SUMMARY OF THE INVENTION

The present invention provides for token based signing of an unsigned binary. An unsigned binary is a stream of bits (e.g., 0's and 1's). An unsigned binary comes as the result, for instance, of the development and compilation of operating system software. The unsigned binary is then signed by the developer of the software using a secret key. The secret key resides in a smart card which makes the secret key unavailable to anyone except the owner of the smart card.

Once plugged in, the developed software is downloaded and verified by the smart card to be authentic. In one embodiment, the downloaded software is encrypted. If the software is authentic, it replaces the prior firmware on that device. The technique of storing the secret key in the smart card significantly reduces the trojan horse problem because the key resides only in one card which makes it impossible to circulate the secret key across a computer network, such as the Internet.

In one embodiment a hash function is placed at the location where the firmware is written and developed, such as a server, and another hash function is placed on the smart card. Once the unsigned binary is generated, the server signs the unsigned binary with the hash. Then, the smart card is plugged in to its respective computing device. Once the smart card is activated, the computing device recognizes the smart card and knows that firmware is about to be downloaded and that the computing device should use the secret key on the smart card to verify the signature.

Next, the firmware is downloaded along with the hash. In one embodiment, the smart card, when inserted, may initiate the download of the unsigned binary and the hash to the user's computing device. In another embodiment, the server downloads the unsigned binary and the hash and the smart card insertion begins the verification process. In either case, the downloaded, unsigned binary and the hash are placed in a temporary buffer area of the computing device's memory.

Next, the computing device accesses its buffer to obtain the unsigned binary and uses the hash on the smart card to sign the unsigned binary. Then, the downloaded hash is sent to the smart card and the smart card verifies that the two hashes are the same. If they are, the downloaded firmware is authentic and it can be used to replace the existing firmware. If the two hashes differ, then the computing device cannot trust the authenticity of the downloaded firmware (for instance, it may be a trojan horse) and it does not replace the existing firmware.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention relates to token based signing of unsigned binaries. In the following description, numerous specific details are set forth to provide a more thorough description of embodiments of the invention. It will be apparent, however, to one skilled in the art, that the invention maybe practiced without these specific details. In other instances, well known features have not been described in detail so as not to obscure the invention.

Token Based Signing The present invention provides for token based signing of an unsigned binary. An unsigned binary is a stream of bits (e.g., 0's and 1's). An unsigned binary comes as the result, for instance, of the development and compilation of operating system software. Typically a developer will write, modify, and compile the software. The finished software is often compiled by a server computer which is where the unsigned binary will initially reside.

Figure 1:
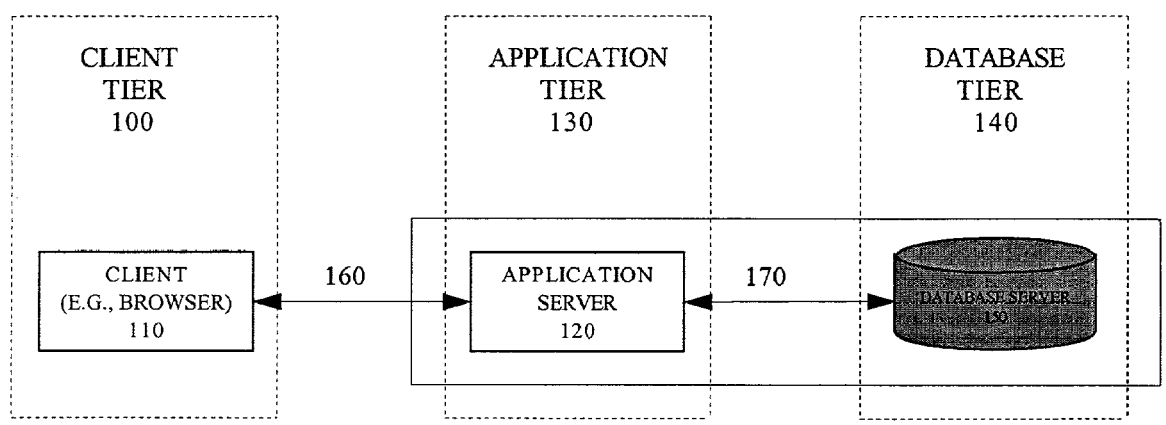
FIG. 1 provides an overview of a multi-tier computer architecture.
Figure 2:
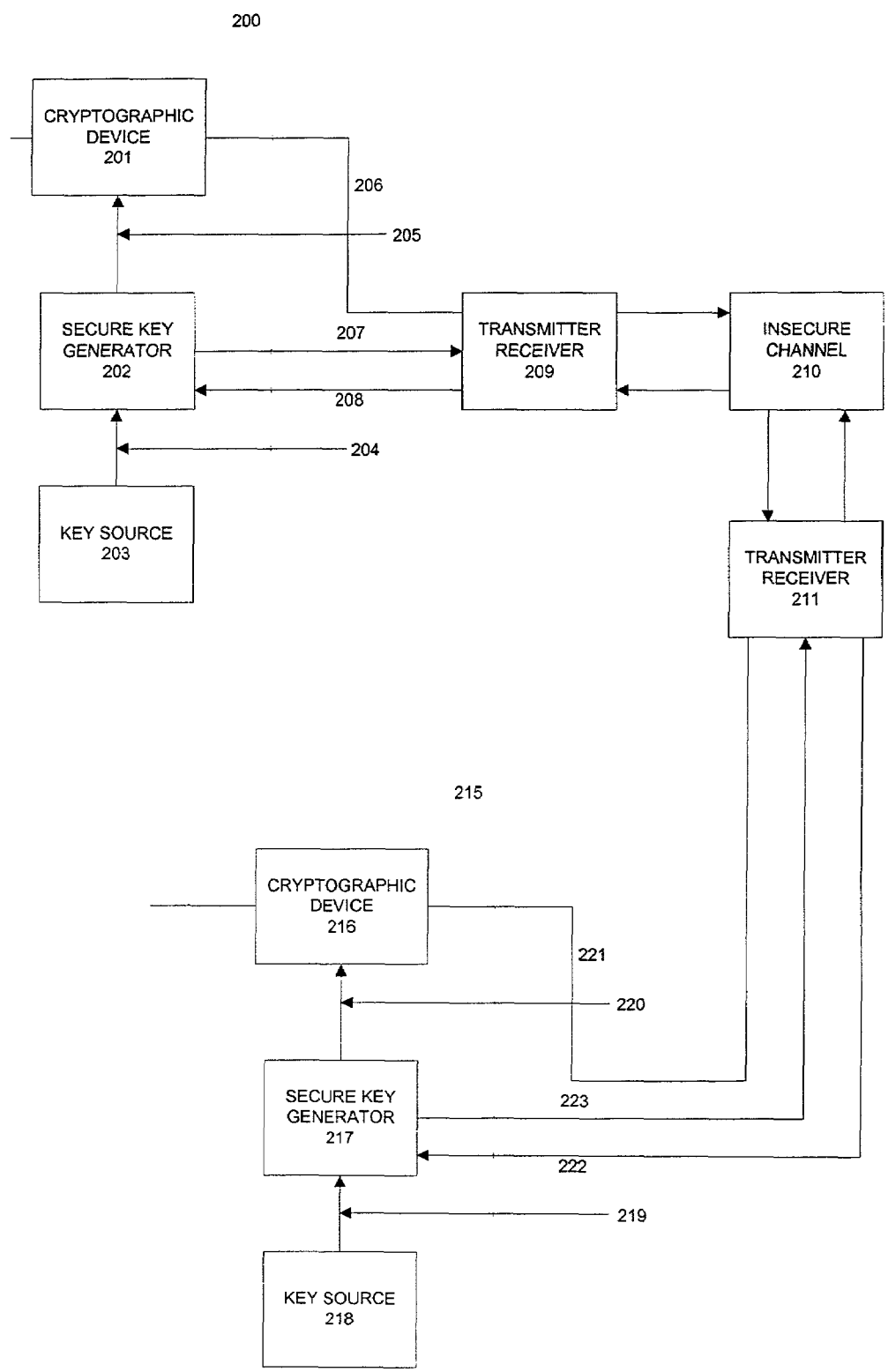
FIG. 2 is a block diagram of a typical public key cryptographic system.
Figure 3:
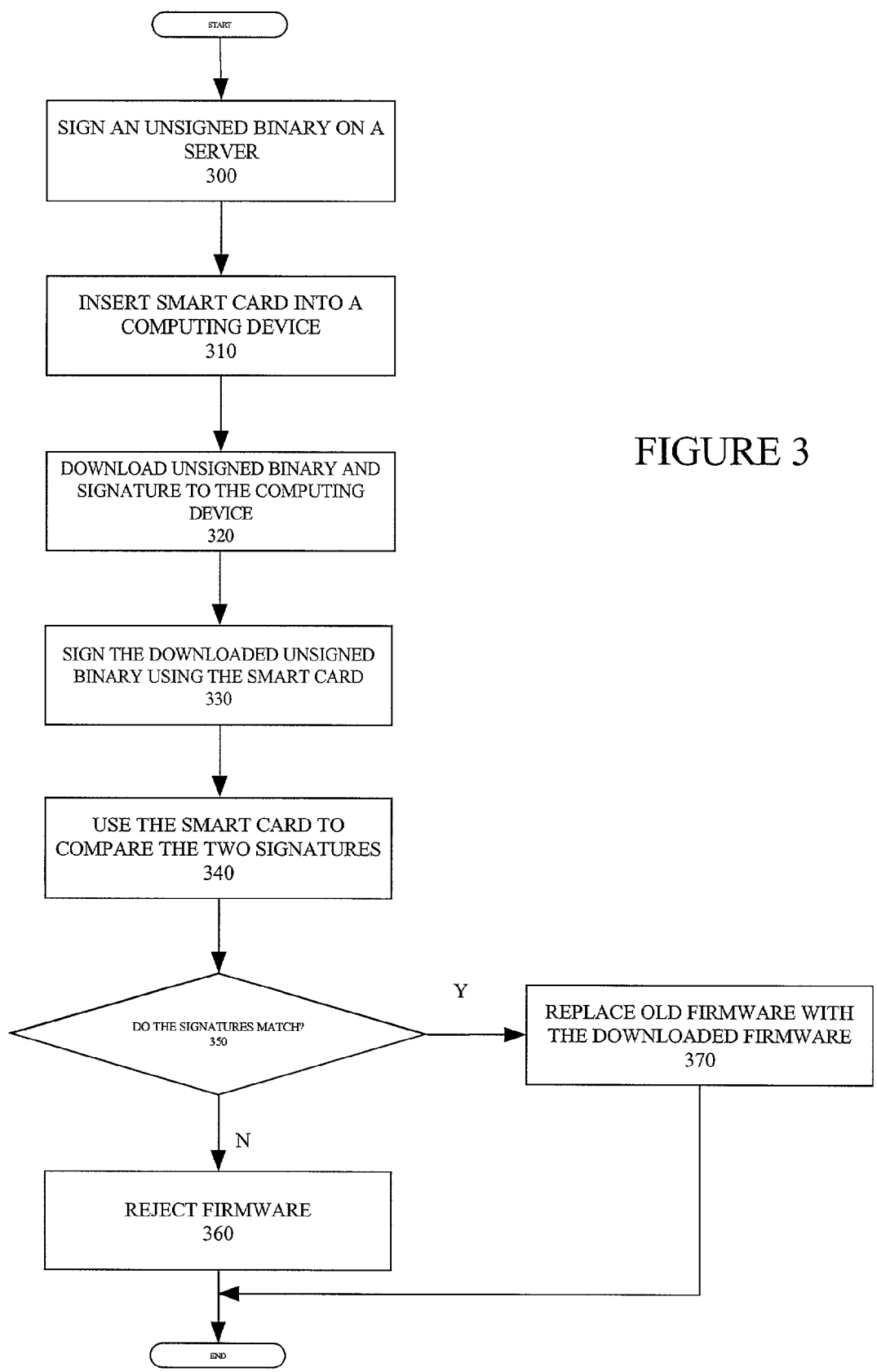
FIG. 3 is a flowchart of token based signing of an unsigned binary according to an embodiment of the present invention.

A mechanism is provided to ensure that the unsigned binary is authentic and may replace a piece of firmware on an existing device. One embodiment of the present invention is shown in FIG. 3. At step 300, an unsigned binary is signed on a server. Then, at step 310, a smart card is inserted into a computing device (e.g., by a developer). Next, the unsigned binary and the signature are downloaded from the server to the computing device at step 320.

After the download, the smart card signs the downloaded, unsigned binary at step 330 using an identical signature methodology that the server used, for instance identical hash functions, and compares the signatures from itself and the server at step 340. Next, it is determined whether the signatures match at step 350. If they do not, the firmware is rejected at step 360. Otherwise, the firmware is judged to be authentic and it replaces the existing firmware at step 370.

In the manner shown in FIG. 3, the secret key that signs the unsigned binary resides in a smart card. This makes the secret key unavailable to anyone except the holder of the smart card. The technique of storing the secret key in the smart card significantly reduces the trojan horse problem because the key resides only in one card which makes it impossible to circulate the secret key across a computer network, such as the Internet.

Encryption

Figure 4:
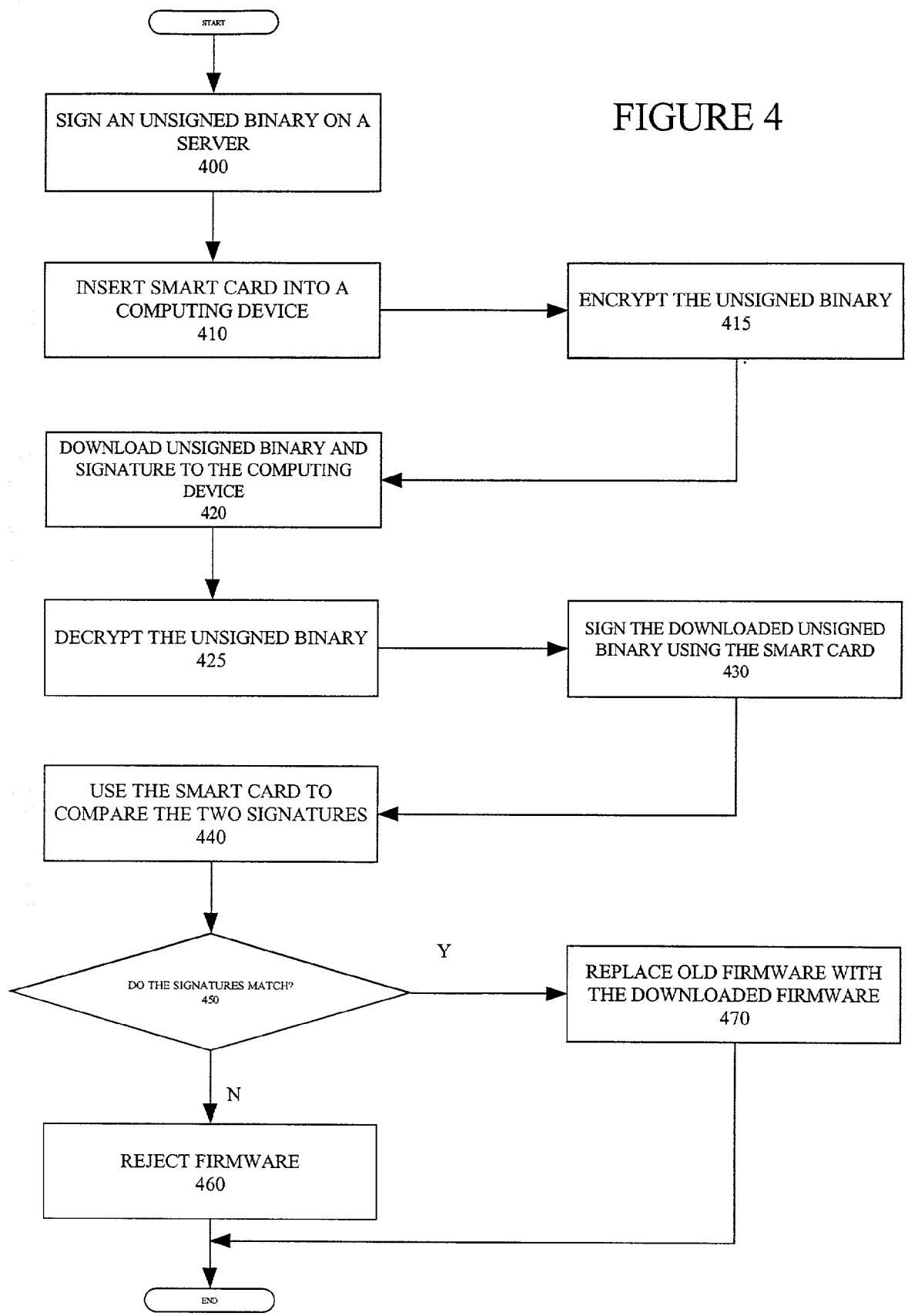
FIG. 4 is a flowchart of token based signing of an unsigned binary according to another embodiment of the present invention.

In one embodiment of the present invention, the unsigned binary is encrypted as well. An embodiment of the present invention having an encryption feature is shown in FIG. 4. At step 400, an unsigned binary is signed on a server. Then, at step 410, a developer inserts a smart card into a computing device. Next, the unsigned binary is encrypted at step 415. Then, the encrypted binary and the signature are downloaded from the server to the computing device at step 420.

After the download, the receiving device decrypts the binary at step 425. Then, the smart card signs the downloaded, unsigned binary at step 430 using an identical signature methodology that the server used and compares the signatures from itself and the server at step 440. Next, it is determined whether the signatures match at step 450. If they do not, the firmware is rejected at step 460. Otherwise, the firmware is judged to be authentic and it replaces the existing firmware at step 470.

Temporary Buffer

Figure 5:
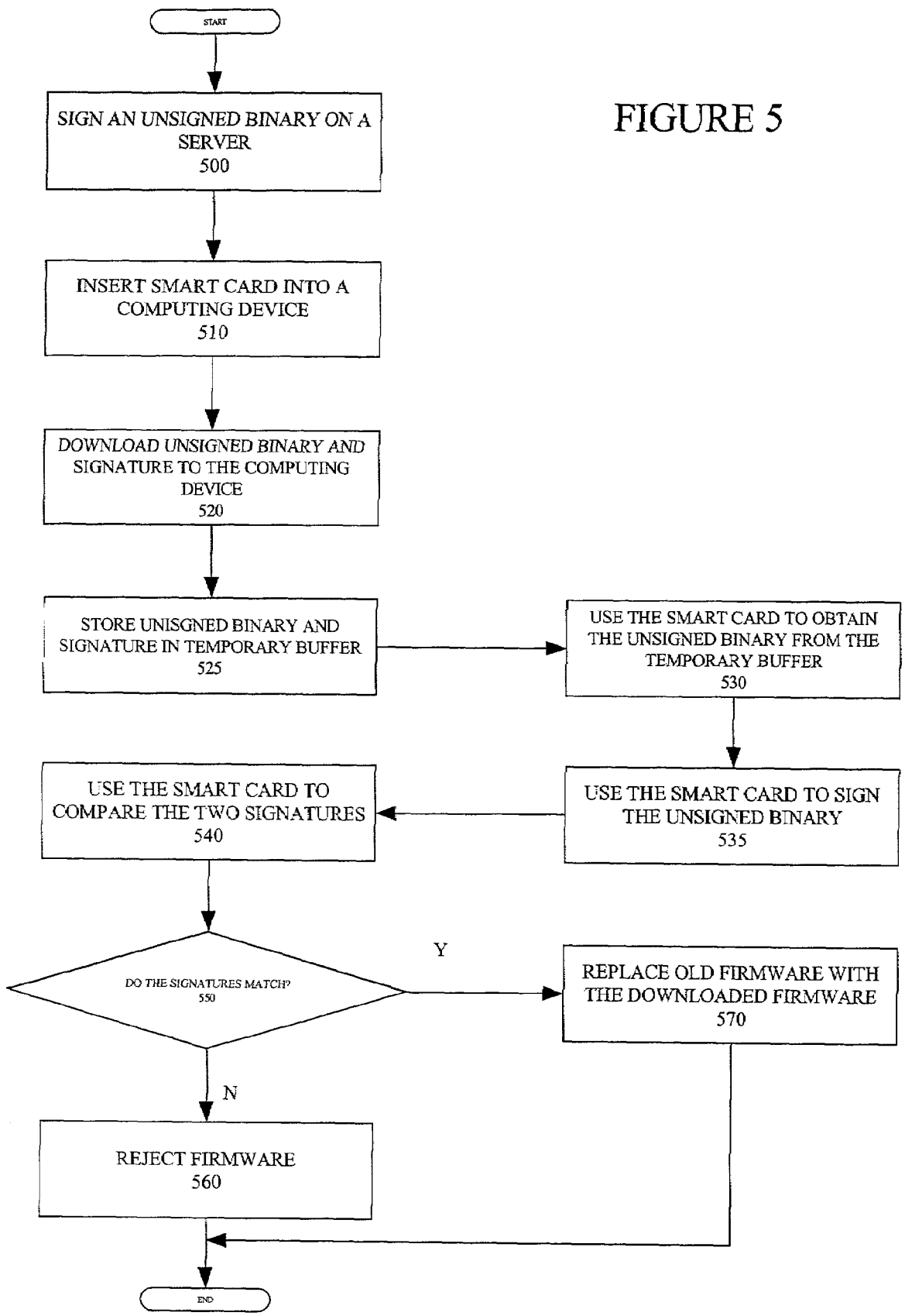
FIG. 5 is a flowchart of token based signing of an unsigned binary according to another embodiment of the present invention.

In one embodiment of the present invention, the unsigned binary is stored in a temporary buffer of the computing device when it is downloaded. An embodiment of the present invention using a temporary buffer is shown in FIG. 5. At step 500, an unsigned binary is signed on a server. Then, at step 510, a developer inserts a smart card into a computing device. Next, the unsigned binary and the signature are downloaded from the server to the computing device at step 520. Upon the download, the binary and the signature are stored in a temporary buffer of the computing device's memory at step 525.

After storing the data in the buffer, the smart card obtains the unsigned binary from the temporary buffer at step 530 and signs it at step 535 using an identical signature methodology that the server used. Next, the smart card compares the signatures from itself and the server at step 540. Next, it is determined whether the signatures match at step 550. If they do not, the firmware is rejected at step 560. Otherwise, the firmware is judged to be authentic and it replaces the existing firmware at step 570.

Smart Card Architecture

Figure 6:
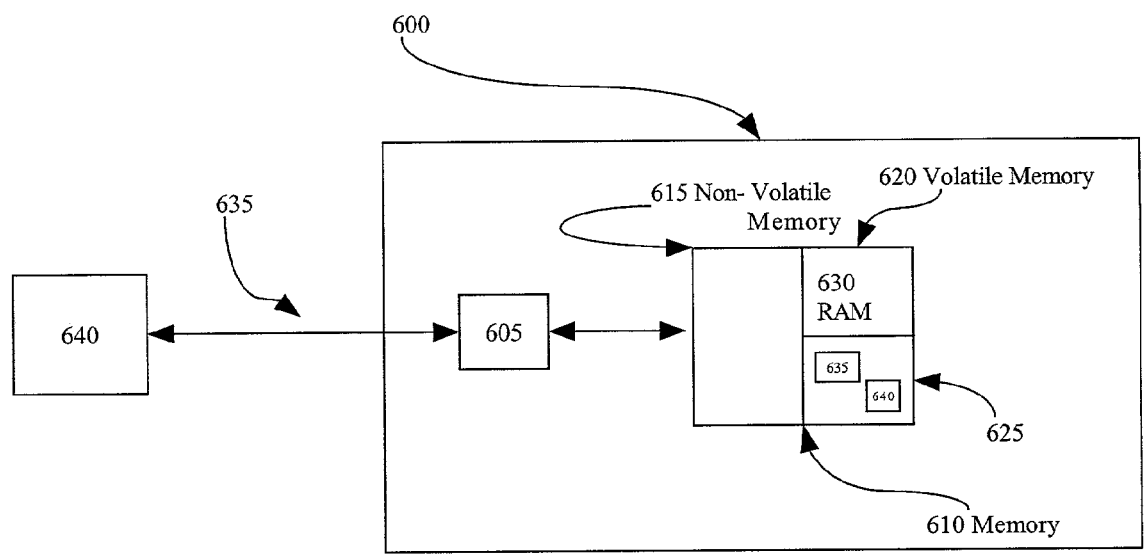
FIG. 6 is an embodiment of a smart card architecture that can be used with the present invention.

FIG. 6 shows the architecture of one embodiment of a smart card that may be used with the present invention. The smart card 600 has a processor 605. This processor may be of limited capacity, such as an 8-bit processor, since the smart card's computational power is limited. The smart card has a memory 610 coupled to the processor which is divided up into non-volatile memory 615 and volatile memory 620. The volatile memory is further divided into EEPROM 625 and RAM 630. The EEPROM contains the operating program for the smart card 635 and other code 640, such as the code necessary to encrypt data and so on.

In one embodiment, the smart card has the ability to have software downloaded into its non-volatile memory where it can execute the program by moving it to RAM where the smart card will act according to the instructions of the computer software. The smart card further has a communications channel 635 between the processor and an external source 650 such as a host computer.

The processor in the smart card is configured to retain information within the smart card that is secret. For instance, a secret key in the smart card will never be divulged across the communications channel 635. The smart card will, however, allow information to come in across the communication channel and use the data. For instance, the smart card is configured to receive data from an external source across the communications channel, to use the secret key in the smart card, for example to sign and encrypt the incoming data, and to send the results out along the communications channel 635 to the external source 640.

Figure 7:
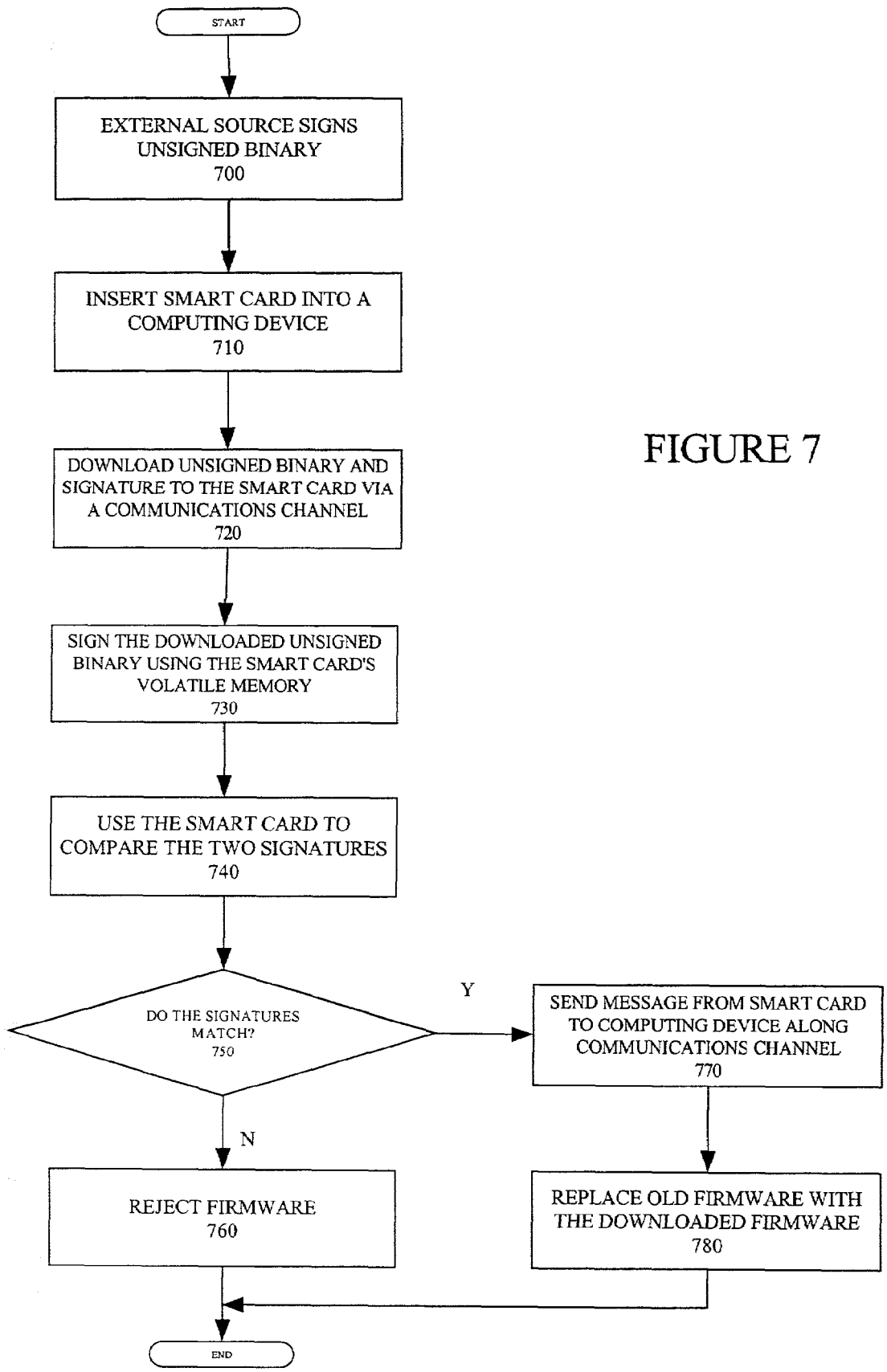
FIG. 7 is a flowchart of token based signing of an unsigned binary according to another embodiment of the present invention.

In one embodiment of the present invention, the smart card architecture is utilized to perform token based signing of an unsigned binary as shown in FIG. 7. At step 700 an unsigned binary is signed by an external source. Then, at step 710, a developer inserts a smart card into a computing device. Next, the unsigned binary and the signature are downloaded from the external source to the smart card via a communications channel in the smart card at step 720.

After the download, the smart card signs the downloaded, unsigned binary in its volatile memory at step 730 using an identical signature methodology that the external source used and compares the signatures from itself and the external source at step 740. Next, it is determined whether the signatures match at step 750. If they do not, the firmware is rejected at step 760. Otherwise, the firmware is judged to be authentic and a message to that effect is sent along the communications channel to the computing device by the smart card at step 770. Once the message is received, the computing device replaces the existing firmware at step 780.

Virtual Desktop System Architecture

Figure 8:
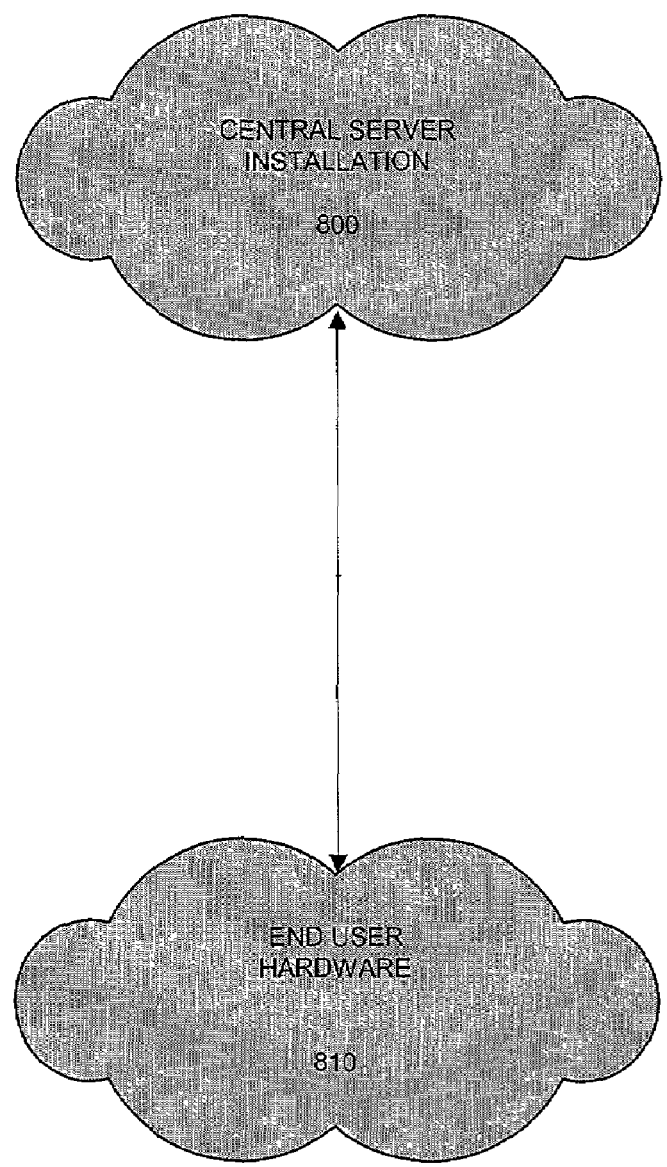
FIG. 8 shows an example of a thin client topology called a virtual desktop system architecture.

FIG. 8 shows an example of a thin client topology called a virtual desktop system architecture. The virtual desktop system architecture provides a re-partitioning of functionality between a central server installation 800 and end user hardware 810. Data and computational functionality are provided by data sources via a centralized processing arrangement. At the user end, all functionality is eliminated except that which generates output to the user (e.g., display and speakers), takes input from the user (e.g., mouse and keyboard) or other peripherals that the user may interact with (e.g., scanners, cameras, removable storage, etc.). All computing is done by the central data source and the computing is done independently of the destination of the data being generated. The output of the source is provided to a terminal, referred to here as a "Human Interface Device" (HID). The HID is capable of receiving the data and displaying the data.

Figure 9:
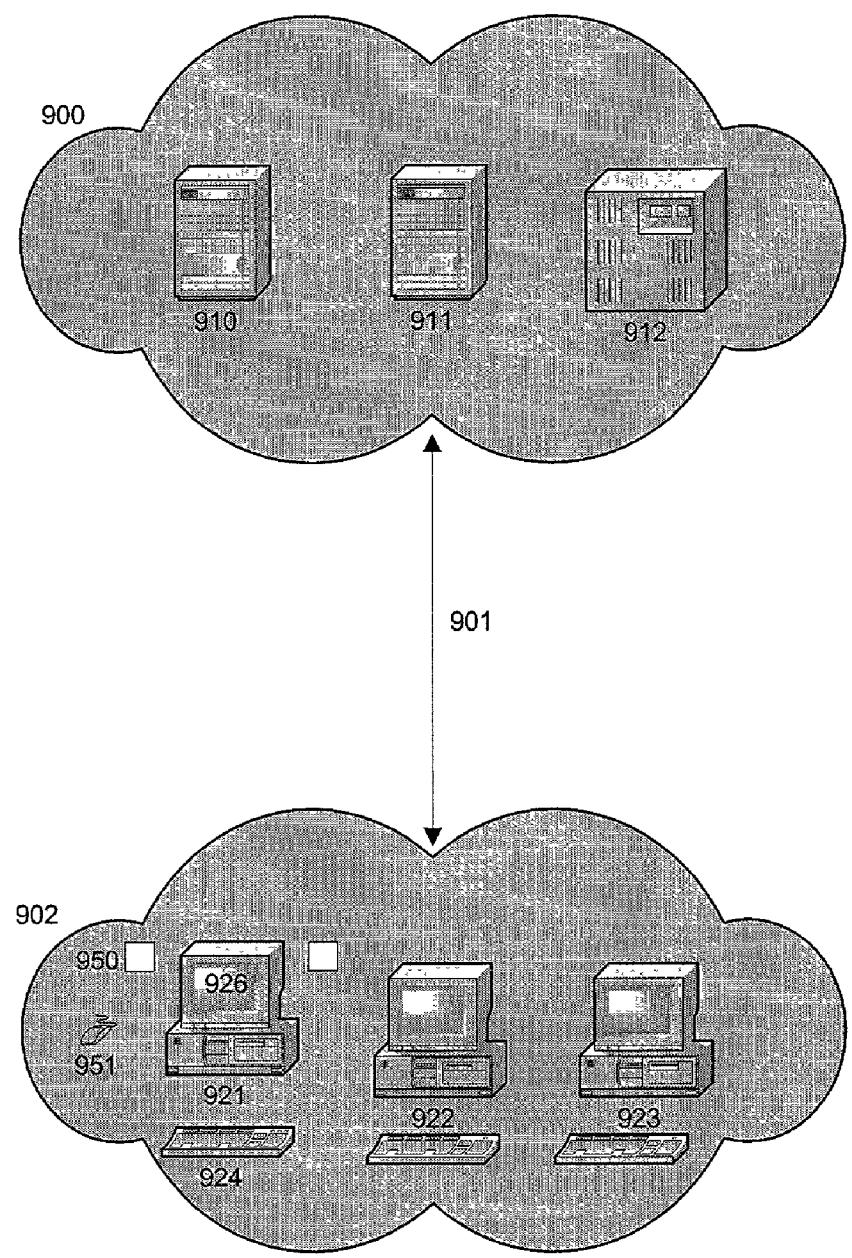
FIG. 9 displays the partitioning of the functionality of the virtual desktop system architecture.

The functionality of the virtual desktop system is partitioned between a display and input device such as a remote system and associated display device, and data sources or services such as a host system interconnected to the remote system via a communication link. The display and input device is a human interface device (HID). The system is partitioned such that state and computation functions have been removed from the HID and reside on data sources or services. One or more services communicate with one or more HIDs through a communication link such as network. An example of such a system is illustrated in FIG. 9, wherein the system comprises computational service providers 900 communicating data through communication link 901 to HIDs 902.

The computational power and state maintenance are provided by the service providers or services. The services are not tied to a specific computer, but may be distributed over one or more traditional desktop systems such as described in connection with FIG. 9, or with traditional servers. One computer may have one or more services, or a service may be implemented by one or more computers. The service provides computation, state and data to HIDs and the service is under the control of a common authority or manager. In FIG. 9, the services are provided by computers 910, 911, and 912. In addition to the services, a central data source can provide data to the HIDs from an external source such as for example the Internet or world wide web. The data source can also be broadcast entities such as those that broadcast data (e.g., television and radio signals).

Examples of services include X11/Unix services, archived or live audio or video services, Windows NT service, Java™ program execution service and others. A service herein is a process that provides output data and response to user requests and input. The service handles communication with an HID currently used by a user to access the service. This includes taking the output from the computational service and converting it to a standard protocol for the HID. The data protocol conversion is handled by a middleware layer, such as the X11 server, the Microsoft Windows interface, video format transcoder, the OpenGL® interface, or a variant of the java.awt.graph service machine handles the translation to and from a virtual desktop architecture wire protocol described further below.

Each service is provided by a computing device optimized for its performance. For example, an Enterprise class machine could be used to provide X11/Unix service, a Sun MediaCenter™ could be used to provide video service, a Hydra based NT machine could provide applet program execution services.

The service providing computer system can connect directly to the HIDs through the interconnect fabric. It is also possible for the service producer to be a proxy for another device providing the computational service, such as a database computer in a three-tier architecture, where the proxy computer might only generate queries and execute user interface code.

The interconnect fabric can comprise any of multiple suitable communication paths for carrying data between the services and the HIDs. In one embodiment the interconnect fabric is a local area network implemented as an Ethernet network. Any other local network may also be utilized. The invention also contemplates the use of wide area networks, the Internet, the world wide web, and others. The interconnect fabric may be implemented with a physical medium such as a wire or fiber optic cable, or it may be implemented in a wireless environment.

The interconnect fabric provides actively managed, low-latency, high-bandwidth communication between the HID and the services being accessed. One embodiment contemplates a single-level, switched network, with cooperative (as opposed to completing) network traffic. Dedicated or shared communications interconnects maybe used in the present invention.

The HID is the means by which users access the computational services provided by the services. FIG. 9 illustrates HIDs 921, 922 and 923. Each HID comprises a display 926, a keyboard 924, mouse 951, and audio speakers 950. The HID includes the electronics need to interface these devices to the interconnection fabric and to transmit to and receive data from the services.

Figure 10:
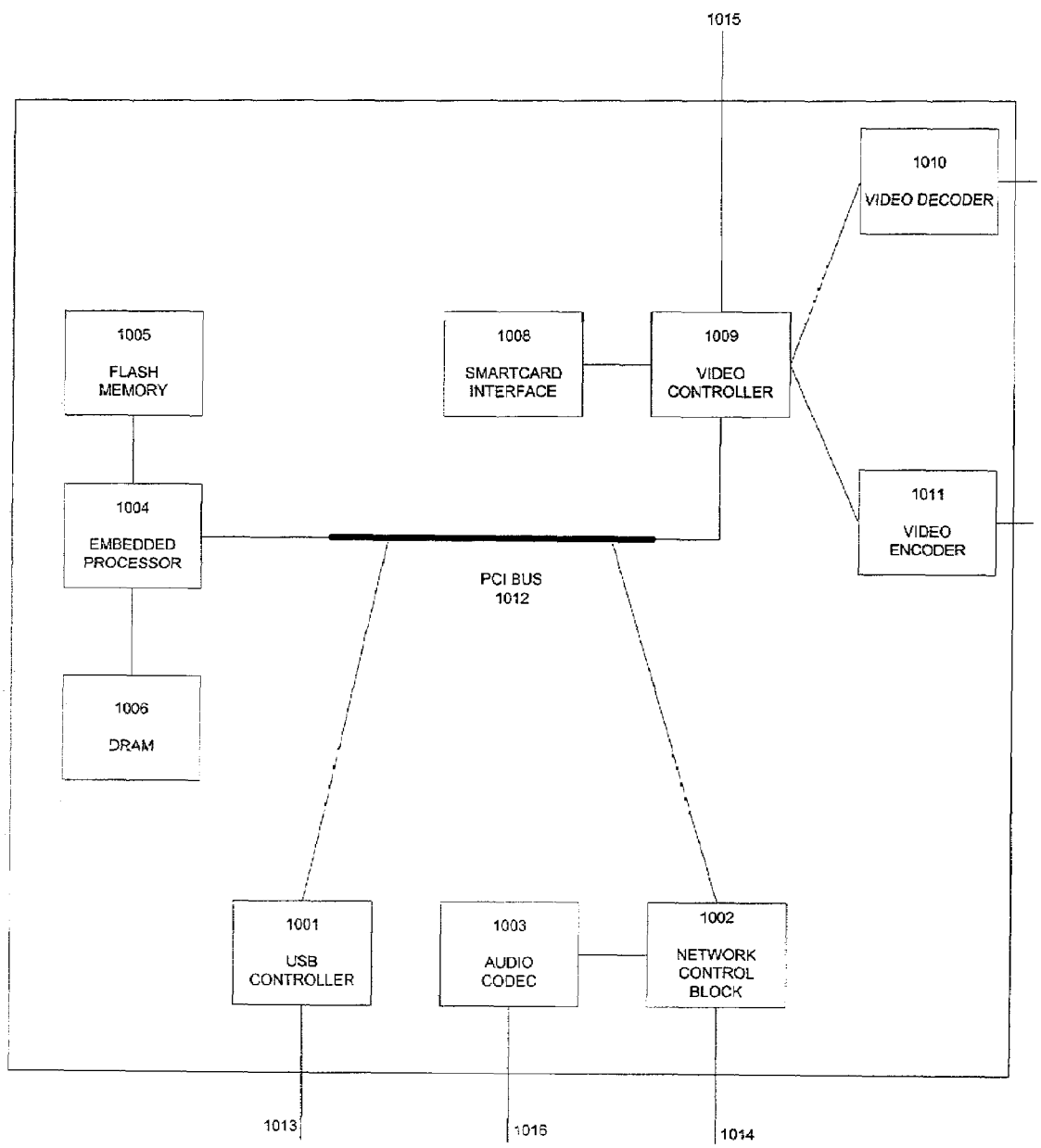
FIG. 10 is a block diagram of an example embodiment of a human interface device.

A block diagram of an example embodiment of the HID is illustrated in FIG. 10. The components of the HID are coupled internally to a PCI bus 1012. Network control block 1002 communicates to the interconnect fabric, such as an Ethernet, through line 1014. An audio codec 1003 receives audio data on interface 1016 and is coupled to network control block 1002. USB data communication is provided on lines 1013 to a USB controller 1001. The HID further comprises a embedded processor 1004 such as a Sparc2ep with coupled flash memory 1005 and DRAM 1006. The USB controller 1001, the network control block 1002 and the embedded processor 1004 are all coupled to the PCI bus 1012. A video controller 1009, also coupled to the PCI bus 1012, can include an ATI RagePro+ frame buffer controller which provides SVGA output on the line 1015. NTSC data is provided in and out of the video controller through video decoder 1010 and encoder 1011 respectively. A smartcard interface 1008 may also be coupled to the video controller 1009.

Figure 11:
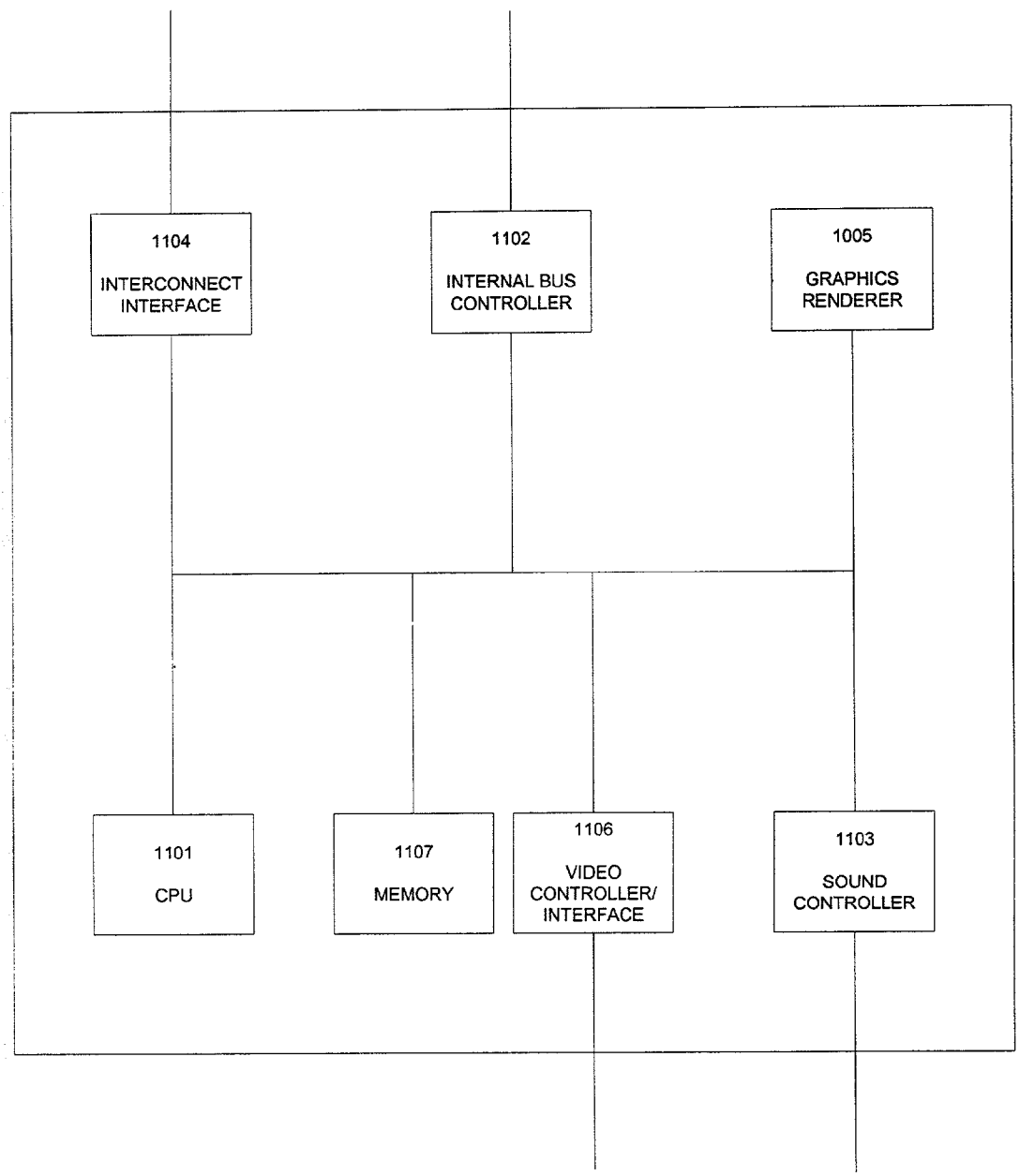
FIG. 11 is a block diagram of a single chip implementation of a human interface device.

Alternatively, the HID can comprise a single chip implementation as illustrated in FIG. 11. The single chip includes the necessary processing capability implemented via CPU 1101 and graphics renderer 1105. Chip memory 1107 is provided, along with video controller/interface 1106. A internal bus (USB) controller 1102 is provided to permit communication to a mouse, keyboard and other local devices attached to the HID. A sound controller 1103 and interconnect interface 1104 are also provided. The video interface shares memory 1107 with the CPU 1101 and graphics renderer 1105. The software used in this embodiment may reside locally in on-volatile memory or it can be loaded through the interconnection interface when the device is powered.

The operation of the virtual desktop system architecture is described in co-pending U.S. patent application Ser. No. 09/063,335, filed Apr. 20, 1998, entitled "Method and Apparatus for Providing A Virtual Desktop System Architecture" and assigned to the present assignee, and incorporated herein by reference.

Embodiment of Computer Execution Environment (Hardware)

Figure 12:
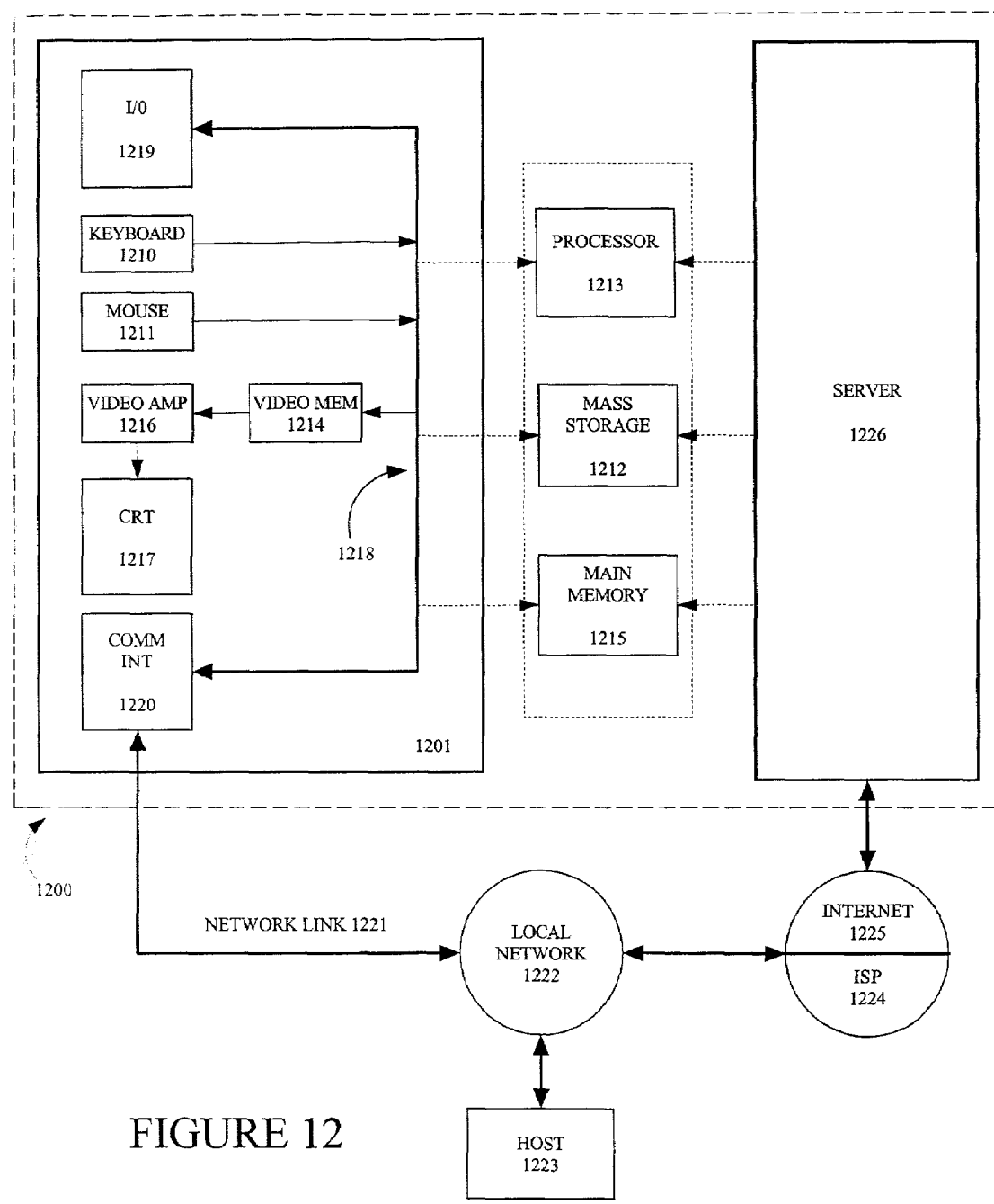
FIG. 12 is an embodiment of a computer execution environment suitable for the present invention.

An embodiment of the invention can be implemented as computer software in the form of computer readable program code executed in a general purpose computing environment such as environment 1200 illustrated in FIG. 12, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 1210 and mouse 1211 are coupled to a system bus 1218. The keyboard and mouse are for introducing user input to the computer system and communicating that user input to central processing unit (CPU) 1213. Other suitable input devices maybe used in addition to, or in place of, the mouse 1211 and keyboard 1210. I/O (input/output) unit 1219 coupled to bi-directional system bus 1218 represents such I/O elements as a printer, A/V (audio/video) I/O, etc.

Computer 1201 may include a communication interface 1220 coupled to bus 1218. Communication interface 1220 provides a two-way data communication coupling via a network link 1221 to a local network 1222. For example, if communication interface 1220 is an integrated services digital network (ISDN) card or a modem, communication interface 1220 provides a data communication connection to the corresponding type of telephone line, which comprises part of network link 1221. If communication interface 1220 is a local area network (LAN) card, communication interface 1220 provides a data communication connection via network link 1221 to a compatible LAN. Wireless links are also possible. In any such implementation, communication interface 1220 sends and receives electrical, electromagnetic or optical signals which carry digital data streams representing various types of information.

Network link 1221 typically provides data communication through one or more networks to other data devices. For example, network link 1221 may provide a connection through local network 1222 to host 1223 or to data equipment operated by ISP 1224. ISP 1224 in turn provides data communication services through the world wide packet data communication network now commonly referred to as the "Internet" 1225. Local network 1222 and Internet 1225 may use electrical, electromagnetic or optical signals which carry digital data streams. The signals through the various networks and the signals on network link 1221 and through communication interface 1220, which carry the digital data to and from computer 1200, are exemplary forms of carrier waves transporting the information.

Processor 1213 may reside wholly on client computer 1201 or wholly on server 1226 or processor 1213 may have its computational power distributed between computer 1201 and server 1226. Server 1226 symbolically is represented in FIG. 12 as one unit, but server 1226 can also be distributed between multiple "tiers". In one embodiment, server 1226 comprises a middle and back tier where application logic executes in the middle tier and persistent data is obtained in the back tier. In the case where processor 1213 resides wholly on server 1226, the results of the computations performed by processor 1213 are transmitted to computer 1201 via Internet 1225, Internet Service Provider (ISP) 1224, local network 1222 and communication interface 1220. In this way, computer 1201 is able to display the results of the computation to a user in the form of output.

Computer 1201 includes a video memory 1214, main memory 1215 and mass storage 1212, all coupled to bi-directional system bus 1218 along with keyboard 1210, mouse 1211 and processor 1213. As with processor 1213, in various computing environments, main memory 1215 and mass storage 1212, can reside wholly on server 1226 or computer 1201, or they may be distributed between the two. Examples of systems where processor 1213, main memory 1215, and mass storage 1212 are distributed between computer 1201 and server 1226 include the thin-client computing architecture developed by Sun Microsystems, Inc., the palm pilot computing device and other personal digital assistants, Internet ready cellular phones and other Internet computing devices, and in platform independent computing environments, such as those that utilize the Java technologies also developed by Sun Microsystems, Inc.

The mass storage 1212 may include both fixed and removable media, such as magnetic, optical or magnetic optical storage systems or any other available mass storage technology. Bus 1218 may contain, for example, thirty-two address lines for addressing video memory 1214 or main memory 1215. The system bus 1218 may also include, for example, a 32-bit data bus for transferring data between and among the components, such as processor 1213, main memory 1215, video memory 1214 and mass storage 1212. Alternatively, multiplex data/address lines may be used instead of separate data and address lines.

In one embodiment of the invention, the processor 1213 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 1215 may be comprised of dynamic random access memory (DRAM). Video memory 1214 maybe a dual-ported video random access memory. One port of the video memory 1214 may be coupled to video amplifier 1216. The video amplifier 1216 may be used to drive a display/output device 1217, such as a cathode ray tube (CRT) raster monitor. Video amplifier 1216 is well known in the art and maybe implemented by any suitable apparatus. This circuitry converts pixel data stored in video memory 1214 to a raster signal suitable for use by display/output device 1217. Display/output device 1217 maybe any type of monitor suitable for displaying graphic images.

Computer 1201 can send messages and receive data, including program code, through the network(s), network link 1221, and communication interface 1220. In the Internet example, remote server computer 1226 might transmit a requested code for an application program through Internet 1225, ISP 1224, local network 1222 and communication interface 1220. The received code maybe executed by processor 1213 as it is received, and/or stored in mass storage 1212, or other non-volatile storage for later execution. In this manner, computer 1200 may obtain application code in the form of a carrier wave. Alternatively, remote server computer 1226 may execute applications using processor 1213, and utilize mass storage 1212, and/or video memory 1215. The results of the execution at server 1226 are then transmitted through Internet 1225, ISP 1224, local network 1222 and communication interface 1220. In this example, computer 1201 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for example only. An embodiment of the invention may be implemented in any type of computer system or programming or processing environment.

Thus, token based signing of unsigned binaries is described in conjunction with one or more specific embodiments. The invention is defined by the claims and their full scope of equivalents.

The invention claimed is:

1. A method for using a smart card to authenticate a downloaded unsigned binary, comprising:
    signing an unsigned binary on a first computing device to generate a first signature;
    downloading said first signature and said unsigned binary to a temporary buffer on a second computing device;
    interfacing a smart card with said second computing device such that the smart card has access to said temporary buffer;
    operating said smart card to read said first signature and said unsigned binary from said temporary buffer;
    operating said smart card to sign said unsigned binary using a secret key present on said smart card to generate a second signature; and
    operating said smart card to compare said first and second signatures,
    wherein a common signing methodology is used on both said first computing device and said smart card to respectively generate said first and second signatures, and wherein said secret key present on said smart card is not accessible by said second computing device.

2. The method of claim 1, further comprising:
    using said unsigned binary on said second computing device, if said smart card determines that said first and second signatures match.

3. The method of claim 1, further comprising:
    rejecting said unsigned binary on said second computing device, if said smart card determines that said first and second signatures do not match.

4. The method of claim 1, wherein said first computing device is a server.

5. The method of claim 1, wherein said common signing methodology utilizes a hash algorithm.

6. The method of claim 1, further comprising:
    encrypting said unsigned binary and said first signature.

7. The method of claim 6, further comprising:
    decrypting said encrypted unsigned binary and first signature.

8. A computer readable medium having program instructions encoded therein for using a smart card to authenticate a downloaded unsigned binary, comprising:
    program instructions for signing an unsigned binary on a first computing device to generate a first signature;
    program instructions for downloading said first signature and said unsigned binary to a temporary buffer on a second computing device;
    program instructions for interfacing a smart card with said second computing device such that said smart card has access to said temporary buffer;
    program instructions for operating said smart card to read said first signature and said unsigned binary from said temporary buffer;
    program instructions for operating said smart card to sign said unsigned binary using a secret key present on said smart card to generate a second signature; and
    program instructions for operating said smart card to compare said first and second signatures,
    wherein a common signing methodology is used on both said first computing device and said smart card to respectively generate said first and second signatures, and wherein said secret key present on said smart card is not accessible by said second computing device.

9. The computer readable medium of claim 8, further comprising:
    program instructions for directing said second computing device to use said unsigned binary on said second computing device, if said first and second signatures match.

10. The computer readable medium of claim 8, further comprising:
    program instructions for directing said second computing device to reject said unsigned binary on said second computing device, if said first and second signatures do not match.

11. The computer readable medium of claim 8, wherein said first computing device is a server.

12. The computer readable medium of claim 8, wherein said common signing methodology utilizes a hash algorithm.

13. The computer readable medium of claim 8, further comprising:
    program instructions for encryting said unsigned binary and said first signature.

14. The computer readable medium of claim 13, further comprising:
    program instructions for decrypting said unsigned binary and said first signature.

* * * * *